Figure 1:
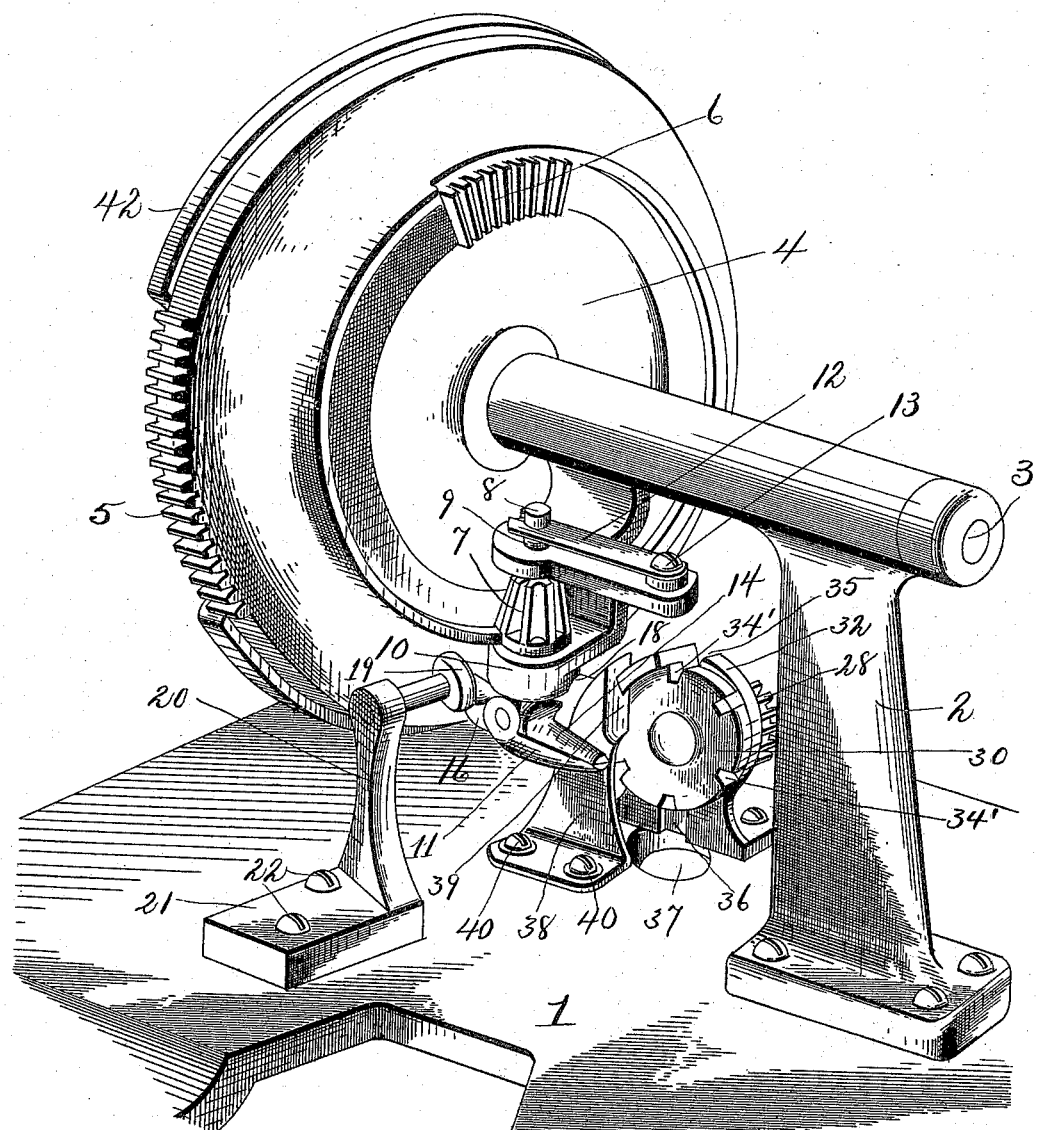

(No Model.)

4 Sheets—Sheet 1.

T. MEASURES.
KNOTTER MECHANISM FOR GRAIN BINDERS, &c.

No. 580,458.

Patented Apr. 13, 1897.

WITNESSES
Carl H. Keller.
Carroll J. Webster.

INVENTOR
Thomas Measures
By William Webster Atty.

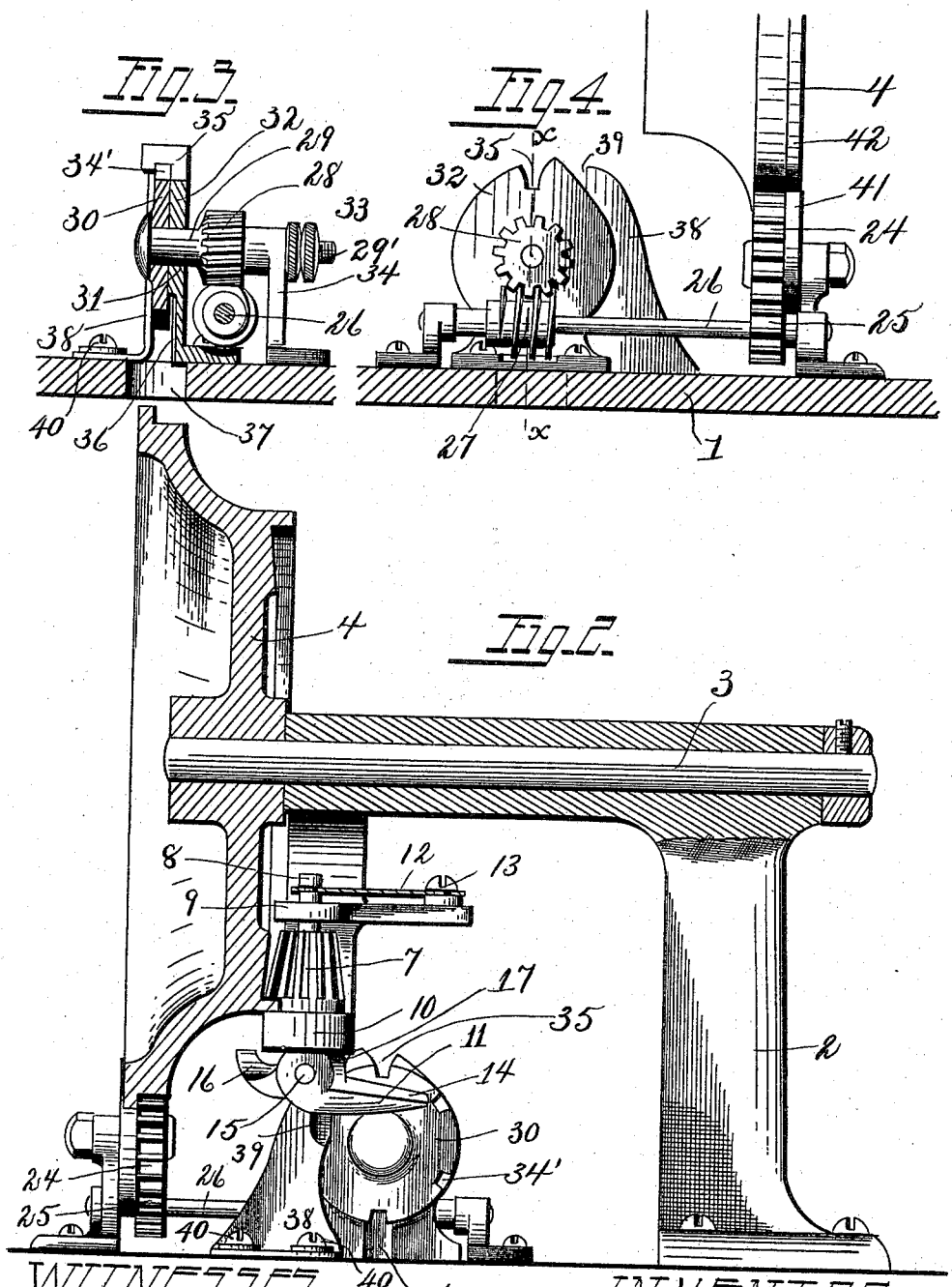

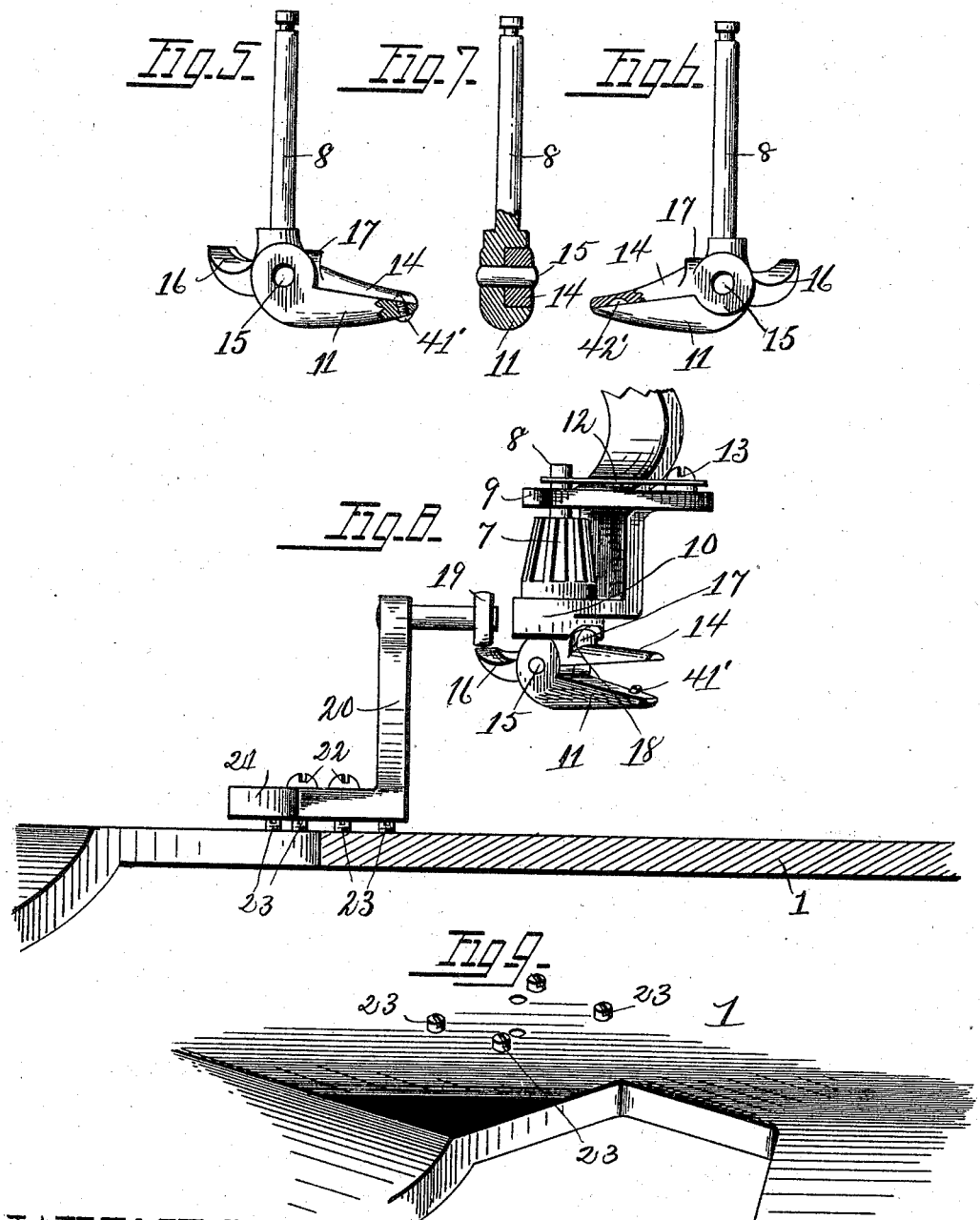

(No Model.)  4 Sheets—Sheet 4.
T. MEASURES.
KNOTTER MECHANISM FOR GRAIN BINDERS, &c.
No. 580,458. Patented Apr. 13, 1897.
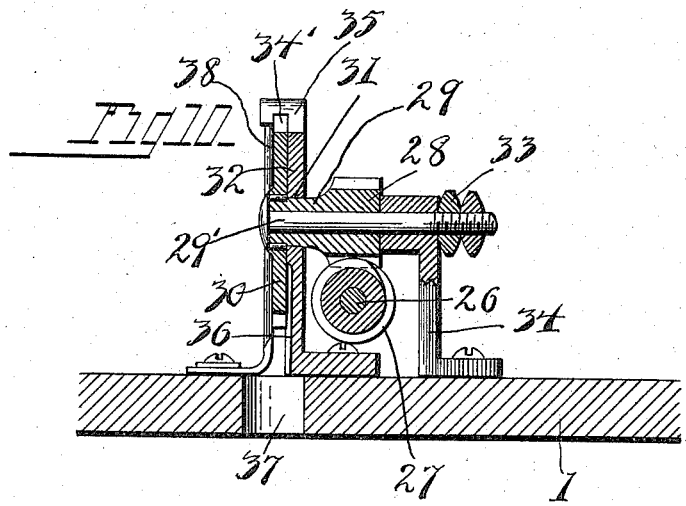

UNITED STATES PATENT OFFICE.

THOMAS MEASURES, OF OGDEN, MICHIGAN.

KNOTTER MECHANISM FOR GRAIN-BINDERS, &c.

SPECIFICATION forming part of Letters Patent No. 580,458, dated April 13, 1897.

Application filed March 23, 1896. Serial No. 584,372. (No model.)

*To all whom it may concern:*

Be it known that I, THOMAS MEASURES, of the township of Ogden, county of Lenawee, and State of Michigan, have invented certain new and useful Improvements in a Knotter Mechanism for Grain-Binders and Tying Bundles; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention relates to a knotter mechanism for grain-binders and for tying bundles of any description, and has for its object to simplify the construction and render the operation more positive and simple than heretofore.

A further object is to dispense with the complication heretofore existing in this class of machines due to the employment of dogs, ratchets, levers, and cam-gears.

A further object is to dispense with the multiplicity of springs heretofore employed and to substitute therefor a positive gear of a character to avoid the strain of a sudden and quick movement necessary to perform the work properly.

A further object is to employ a stationary knife in close proximity to the twine-holding mechanism and also to the knotter-bill, whereby economy of twine is insured.

A further object is to provide an adjustable bearing for the cam-face of the knotter-bill, thereby allowing of an adjustment to compensate for wear.

A further object is to provide novel means for opening and closing the knotter-bills, comprising a vertically-movable spindle carrying the knotter-bills, with mechanism to control the movement of said spindle during a portion of its revolution and a resilient connection to control the operation of the bill in a further revolution.

A further object is to combine a mutilated spur-gear and a mutilated bevel face-gear in one with a direct connection with a spur-gear and a twine-holding mechanism of a worm-gear, thereby avoiding dead-centers or impact in the necessary intermittent motion, and at the same time provide a direct connection with the pinion of the knotter-bill.

A further object is to provide a removable and adjustable means connected with one of the knotter-bills, whereby a bow-knot or a hard knot may be tied at will.

A further object is to provide means for disposing of the fragmentary portions of twine severed by the knife and interposed between the holding-disks.

In the drawings, Figure 1 is a perspective view of the knotter mechanism to disclose the construction thereof. Fig. 2 is an elevation of the mechanism, the journaled standard and driving-wheel being shown in section. Fig. 3 is a side elevation of the cutter and twine-holding mechanism, the revolving and stationary cutter-disks being shown in section. Fig. 4 is a rear elevation of the same. Fig. 5 is an elevation of the knotter-bills and the spindle which is integral with the lower bill. Fig. 6 is a like view on the reverse side of the upper knotter-bill. Fig. 7 is a cross-section of the knotter-bills pivoted together. Fig. 8 is a view disclosing the operation of the knotter-bills when in the act of opening to receive the twine between them. Fig. 9 shows a portion of the base-plate with set-screws therein, the purpose of which will be shown in the description following. Fig. 10 is a sectional elevation taken at a point indicated by lines $x$ $x$, Fig. 4.

1 is a base-plate comprising a suitable portion or extension of the binder-frame to bring the knotter mechanism in proper alinement with the twine-needle. Upon the base-plate 1 is a standard 2. Journaled in the top thereof is a shaft 3 of a drive-wheel 4. Drive-wheel 4 combines a mutilated spur-gear 5 on the periphery thereof and a mutilated bevel crown-gear 6 on the face thereof.

As the drive-wheel is revolved bevel-gear 6 is made to operate a bevel-wheel 7, keyed to a spindle 8, journaled at 9 and 10, respectively, and integral with the knotter-bill 11. The upper end of the spindle 8 is grooved circumferentially to receive a forked spring 12, secured at 13, and is thereby subjected to a vertically upward tension. Knotter-bill 14 is constructed on either side of its pivot 15 with cam-faces 16 and 17, respectively. Cam-face 17 is made to travel the lower face of journal 10, which is cut away at 18, as shown in Figs. 1 and 8, and is held in close frictional contact thereto by the tension on spindle 8, to which it is pivoted.

Cam-face 16 in the course of revolution of the knotter-bills is made to contact with guide-roller 19, which is diametrically opposite to the cut-away portion 18 on the face-journal 10, so that when cam-face 16 is depressed cam-face 17 rises into the cut-away portion 18, thereby insuring a uniform period for the opening and closing of the knotter-bills and providing a reliable means for holding the knotter-bills closed independent of the tension of the twine thereon. Guide-roller 19 is supported by a standard 20, having a broad base 21, secured by screws 22 to the base-plate 1. Beneath the base 21 and screwed into the base-plate 1 are a plurality of set-screws 23, which permit of the vertical adjustment of base 21 and guide-roller 19, thus compensating for any wear of the cam-face 16 and establishing a means for opening the knotter-bills to any desired angle.

When the revolution of the drive-wheel 4 takes place, mutilated spur-gear 5 operates upon intermediate gear-wheel 24, which meshes with a gear-wheel 25 upon a shaft 26, having thereon a worm 27. Worm 27 is in mesh with a worm-wheel 28 upon a tubular shaft 29, to which is secured rotary cutter and twine-holder disk 30. Shaft 29 is journaled at 31 in a plate 32, which forms a backing for the disk 30, and is further secured by a bolt 29', running centrally thereof, tension being put thereon by nuts 33, which seat against a bracket 34, secured to the base-plate 1. Cutter-disk 30 is formed circumferentially with a plurality of equidistant depressions 34' and is made to seat closely against the back plate 32, which has a single depression 35 at the top thereof to correspond with those in the cutter-disk. The face of the back plate 32, adjoining the cutter-disk, is cut away on its lower portion, as at 36, and immediately adjoining the same is an opening 37 in the base-plate 1.

Adjoining the face of the cutter-disk 30 and in frictional contact therewith is an adjustable knife 38, having a cutting edge at 39 and secured to the base 1 by means of screws 40. Gear-wheel 24 is secured to a disk 41, which is cut away on one side thereof to closely fit a circumferential flange 42 on the wheel 4. The portion of flange 42 immediately adjoining the spur-gear 5 is also cut away, thereby permitting the revolution of gear-wheel 24 only when in mesh with spur-gear 5. A single revolution of the drive-wheel 4 will effect a double revolution of the gear-wheel 25 and shaft 26, which carries the worm 27. Worm 27, operating upon worm-wheel 28, produces one-sixth of a revolution of the same to every double revolution of itself, and consequently one-sixth of a revolution of the cutter-disk, thus for every revolution of the drive-wheel 4 we have one-sixth of the revolution of the cutter-disk. The depressions in the periphery of the cutter-disk being equidistant from one another will advance successively and coincide with depressions 35 in back plate 32.

In operation the needle, after forming the loop around the bundle of grain, returns and passes the twine over the knotter-bills and into the recess 35 and corresponding recess 34' in the cutter-disk. The knotter-bill is then revolved by the revolution of the drive-wheel 4, when the twine is formed in a loop on the knotter-bills. Before completing their revolution the knotter-bills open to receive the twine between them and they again close, when the tension of the bundle will slip the loop surrounding the knotter-bills therefrom over the twine held between the same. After the knotter-bills have completed their revolution the drive-wheel 4, continuing to revolve, will operate the cutter mechanism as described, thereby advancing the twine to the cutting edge of the knife and insuring a positive means for severing the twine.

While performing the operation of cutting the twine, fragments of the same are held between the cutter-disk 30 and plate 32 and would, unless a provision were made to prevent the same, revolve with the disk 30 and clog the same, causing frequent delays. To obviate this difficulty, I cut away the lower face of plate 32 to allow the fragments to fall therefrom and provide an opening 37 to receive the same. Thus it will be seen that all fragmentary pieces are removed from the cutter-disk.

As it is desirable to tie either a hard knot or a slip-knot, I have provided a tooth 41' to be screwed into the lower jaw and easily removable and a coincident recess 42' in the upper jaw to receive the tooth. When it is desired to tie a hard knot, the tooth is inserted, which draws out the loop held between the jaws and ties a hard knot. If, however, it is desired to tie a slip or bow knot, the tooth is removed, which allows the loop to slip from the jaws.

By the foregoing description it will be seen that the parts are few in number and the mechanism extremely simple and effective in operation.

What I claim is—

1. In a knotter mechanism for grain-binders, knotter-bills and means for revolving the same intermittently, a spindle carrying the knotter-bills journaled in a bearing secured to the base, a spring having one end secured to the bearing and the opposite free end engaging with the spindle for exerting an upward pull thereon to normally hold the knotter-bills against the under side of the bearing and to take up the wear incident to the revolution of the knotter-bills.

2. In a knotter mechanism for grain-binders, knotter-bills and means for revolving the same intermittently, a spindle carrying the knotter-bills journaled in a bearing secured to the base, a spring having one end secured to the bearing and the opposite free end engaging with the spindle for exerting an upward pull thereon to normally hold the knotter-bills against the under side of the bearing and to take up the wear incident to the revolution of the knotter-bills, cam-faces upon opposite sides of one of the knotter-bills, one of said cam-faces normally bearing against the under side of the bearing, due to the tension of the spring, the opposite cam-face extending beyond the bills, a recess in the bearing in the path of travel of the first-mentioned cam-face, and a projection secured to the base of the path of travel of the latter-mentioned cam-face, whereby the bills are forced open against the tension of the spring to receive the binding-twine.

3. In a knotter mechanism for grain-binders, a drive-wheel, a twine holding and cutting mechanism operated thereby, comprising bearings secured to the base and extending upwardly therefrom, a spur-gear journaled in one of the bearings, a holding-disk secured upon the gear to turn therewith, a bolt passing through the bore of the spur-gear and the opposite bearing for assembling the several parts together, a depression in the upper face of one of the bearings, a like depression in the holding-disk around its periphery, and means for intermittently presenting successively the depressions of the holding-disk in alinement with the depression in the bearing, and a flange extending upwardly from the bearing to embrace the holding-disk.

4. In a knotter mechanism for grain-binders, knotter-bills and means for revolving the same intermittently, a spring for exerting an upward pull upon the knotter-bills, cam-faces upon opposite sides of one of the bills, one of which projects beyond the bills, and a projection secured to the base in the path of travel of the said projecting cam-face for forcing open the knotter-bills for receiving the twine, said projection being mounted upon the base through the intervention of screws, whereby the arm can be adjusted vertically to open the knotter-bills to any desired angle, and to compensate for wear of the knotter-bills.

5. In a knotter mechanism for grain-binders, knotter-bills and means for revolving the same, a removable stud upon one of the bills projecting above the same, and a recess in the opposite bill to receive the end of the stud.

In testimony that I claim the foregoing as my own I hereby affix my signature in presence of two witnesses.

THOMAS MEASURES.

Witnesses:
GEORGE W. WILT,
SARAH J. WILT.